INVENTORS
Ernst Kuss (deceased) by Kaethe Kuss sole heiress of Ernst Kuss
Dominikus Remagen
Ernst Rosin
Heinrich Schackmann BY Theodore M. Jablon
ATTORNEY

INVENTORS
Ernst Kuss (deceased) by Kaethe Kuss sole heiress of Ernst Kuss
Dominikus Remagen
Ernst Rosin
Heinrich Schackmann BY Theodore M. Jablon
ATTORNEY

Fig. 10.

Dec. 6, 1960 E. KUSS ET AL 2,963,157
SEPARATION OF SOLIDS FROM LIQUIDS BY SEDIMENTATION
Filed March 15, 1957 6 Sheets-Sheet 6

Fig. 11.

INVENTORS
Ernst Kuss (deceased) by Kaethe Kuss sole heiress of Ernst Kuss
Dominikus Remagen
BY Ernst Rosin
Heinrich Schackmann Theodore M. Jablon
ATTORNEY 2,963,157
Patented Dec. 6, 1960

2,963,157

SEPARATION OF SOLIDS FROM LIQUIDS BY SEDIMENTATION

Ernst Kuss, deceased, late of Duisburg, Germany, by Kaethe Kuss, nee Schmidt, heir, Duisburg, Germany; Dominikus Remagen, Ernst Rosin, and Heinrich Schackmann, Duisburg, Germany Filed Mar. 15, 1957, Ser. No. 646,456

5 Claims. (Cl. 210—83)

This invention relates to the separation of solids from liquids by sedimentation.

Known sludge or sedimentation type separators called thickeners, generally consist of a shallow tank having at its upper rim an overflow outlet for the clarified liquid, and, operating over the bottom of the thickener, a raking mechanism having horizontal rake arms with raking blades fastened on them by means of carrier elements, the settled sludge being conveyed by the raking mechanism towards the outlet at the center of the tank bottom; this outlet may be provided with a controllable outlet valve.

Heretofore, it has been considered satisfactory to have the thickener discharge a sludge that is easily pumpable, but which, due to its relatively low solids content often carries away with it valuable liquid.

The conventional thickeners therefore operate within a thickening range in which the raking blades merely serve to encourage the movement of the sludge in its sliding movement over the tank bottom towards the outlet. Thus, the blades operate in a relatively very thin layer of sludge which is considered as the end concentration of the sludge, where the interior structure of the sludge or the relation of the particles to one another has reached that state in which the particles touch one another, but do not settle any further, having attained that degree of fluidity and particle concentration at which they are usually conveyed by the raking mechanism and discharged. By comparison with the superjacent intermediate or transitional zones of the settling process, the sludge layer according to the conventional mode of operation is very thin and is maintained only in strict relation to a carefully controlled rate of sludge discharge. Hence, in conventional thickener operation there is provided either none or only a very small sludge accumulation.

By contrast, the present invention solves the problem that in the clarification of suspensions of all kinds there is to be attained a maximum of solids content in the sludge being discharged from the thickener, even with materials which have a high settling rate, producing a heavy tough kind of sludge. In such cases, it is a special problem to maintain the sludge being formed during the thickening process in a constant state of fluidity and to avoid local stagnation. This is because many sludges at higher concentrations exhibit a thixotropic behaviour which makes them subject to a degree of solidification that prevents fluidity, which through local solidifications and stagnation would quickly stop the operation of the thickener, not to mention the fact that the pumpability of the sludge at once ceases.

By way of contrast the present invention is based upon the astonishing discovery that it is possible to push the thickening process to a range of higher sludge concentration in which the sludge would normally, because of thixotropic characteristics, no longer maintain a state of fluidity, provided that the sludge in that range of higher concentration is subjected to a compression and a kneading action as well as moved by means of a suitable raking mechanism.

This invention provides a method for the separation of solids from liquids by continuous sedimentation and thickening in a thickener which is provided with raking blades, and in which are formed an upper clarification zone, a subjacent sedimentation zone, and, at the bottom, a sludge zone, wherein the sludge in the sludge zone is allowed to accumulate to a level above the height of the raking blades but beneath the height of rake arms from which the blades are supported, the sludge that lies within the reach of the raking blade being conveyed towards a central discharge opening at a rate greater than the rate at which it passes through the opening while being subjected to continuous kneading and the sludge that is above the blades resting upon the portion that is being kneaded.

Thus, the present invention enables an additional sludge compression-mixing-and kneading zone to be interposed between the known zones of free and hindered settling on the one hand and the raking zone on the other hand. With such arrangement and functioning of the zones it is possible to maintain the sludge in a state of fluidity despite its tendency towards solidification, and to effect an uninhibited discharge. Hence, in that zone there exists a sludge layer that provides an additional static pressure under which to produce the desired degree of thickening concentration. For example, treating an ore suspension according to the process of this invention, it is possible to attain a solids concentration even as high as 1400 g. solids per litre of sludge, which represents a concentration which in conventional practice, would lead to solidification of the sludge, whereas in the practice of this invention that effect is avoided. Within the additionally interposed densification or compression and kneading zone the particles are deliberately detained for a significant period of time, with resultant accumulation and mixing of the sludge.

In a preferred embodiment of this invention, the state of fluidity of the sludge in the additional compression and kneading zone is encouraged whereby the raking mechanism operating in a round thickener tank imparts to the sludge at the center an upwardly directed movement, so that in the upper part of the additional zone the sludge moves radially outwardly and in the marginal zone again downwardly. This provides a continuous turning over of the sludge within the entire thickening zone to the end of additional thickening, in that the volume of sludge being conveyed towards the sludge outlet is greater than the volume of sludge actually discharged. Through this turning over of the sludge the following thickening effects are attained:

(1) Whereas in the usual manner care must be taken that agitation be as far as possible avoided in the clarification zone above the rake arms, a further thickening effect occurs in the compression and kneading zone which in depth extends above the raking blades, this effect being encouraged by the additional movement of the raking blades. The cyclic turning over of the sludge produces a kneading effect in that the raking mechanism conveys the sludge in the bottom zone towards the central sludge discharge at a considerably greater rate than corresponds to the rate at which the sludge is being discharged. Due to this kneading effect the liquid is displaced more readily in an upward direction, with a resultant increase in sludge concentration. Moreover, this kneading effect prevents objectionable local sludge deposits, inasmuch as it prevents thixotropic solidification.

(2) Moreover, especially with suspensions containing solids of different particle size fractions which in the conventional clarification process would tend to de-mix, there is effected a mixing of these size fractions, whereby further concentration of the sludge is encouraged.

(3) Due to a larger quantity of sludge being conveyed by the raking blades towards the center than is being discharged, the raking blades move the sludge first over the bottom towards the center, while the excess of the sludge which is not being discharged, rises at the center to again pass outwardly then to descend at the periphery of the thickening tank. In this way there is created a circulatory motion in the radial direction of the raking mechanism.

As a result, the sludge thickening process provided by this invention produces a range of concentration heretofore not attained in this manner, comparable to a particle concentration of a filter cake.

Figures 1, 2:
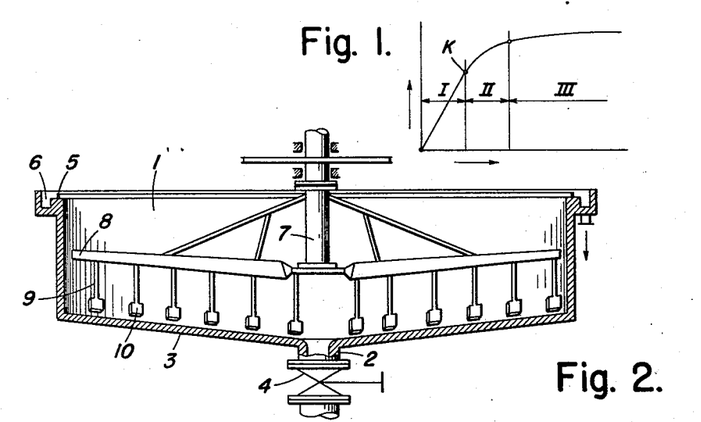
Figure 1 is a graph showing the height of clear liquid plotted against the time of sedimentation.
Figure 2 is a diagrammatic vertical cross-section of a sedimentation separator constructed in accordance with the invention.

The special manner of thickening according to this invention can be explained in greater detail by way of Figure 1 of the drawings.

In this drawing, the clarification time is plotted on the abscissa as a function of the clarification column on the ordinate. In order to determine the detention time of a suspension in a thickener for producing a dischargeable sludge, a glass cylinder is usually filled with the suspension, and during quiescence the particles subside at a substantially uniform rate. After a certain stage of sedimentation has been reached corresponding to point K, the rate of sedimentation is slowed down considerably, so that conventionally it was considered uneconomical to allow the sludge to be detained any longer in the settling tank than for a period corresponding to the point K, especially in view of the fact that with conventional tanks and raking mechanisms the settled sludge was liable to be stirred up again because of the motion of the raking mechanism. Thus it was considered that the relatively slow compression above point K was unsuited with the usual thin bottom layer of sludge.

However, according to this invention by allowing for a significantly large detention time the particles are given an opportunity—due to the compression zone inserted between the raking zone and the hindered settling zone—further to settle and concentrate in the zone in accordance with the further course past point K of the curve. In this way, the thickening of concentration is pushed to the border line between range II and range III of the curve or even into range III itself, by allowing the sludge to be detained for a corresponding length of time while discharging only a portion of the sludge which has attained this state of concentration and detaining the main sludge volume occupying the space above the kneading zone but below the hindered settling zone to allow it to be further densified.

In accordance with the invention, the solid material is separated from liquids containing solids by sedimentation. The liquid containing the suspended solid is maintained in a volume-confined zone, such as, for example, a cylindrical sedimentation or thickening tank. The volume-confined zone has a solid material discharge opening at its bottom, such as, for example, in the center of the sedimentation tank. As a solid material in the form of sludge separates out from the liquid at the bottom of the zone, the sludge is conveyed, such as, for example, by raking devices, towards the discharge opening at a rate greater than the settling rate of the sludge, so that the amount of sludge conveyed toward the discharge opening is always larger than the amount of sludge which collects at the same time. In this manner, while the individual particles of solids within the layer of sludge continuously descend to the bottom of the zone, the sludge as a whole is moved across the bottom of the zone towards the discharge opening and flows outwardly again away from the discharge opening, due to the greater rate of travel and settling, thereby causing the turning over or kneading of the sludge. The sludge on which the raking device has acted in this manner has reached the point of sedimentation in which the particles of solids are no longer freely suspended in the sludge but contact one another and are incapable of settling freely; the zone in which this takes place is referred to as the compression zone.

Thus, in accordance with the invention, a thorough kneading is effected during the time the sludge is being conveyed, such as, for example, by the raking device.

The invention is applicable to the treatment of all types of sludge, but it is particularly suitable in its application to the treatment of sludges which contain particles of solids and are particularly heavy, settle readily, and form sludges of such a consistency that they cannot be handled by raking devices of conventional design.

When using a conventional cylindrical sedimentation tank with the sludge discharge opening in the center of the bottom, in the practice of this invention, the sludge will be forced to move radially outwardly from the center of the tank. In this manner the present invention makes it possible, to obtain a sludge from an ore dust pulp having a final density of up to 1400 g. of solid per litre, which sludge is, at the same time, capable of flowing and can be pumped and can be discharged from the sedimentation vessel without any trouble. This is in contrast to the conventional methods in which sludges having a strong tendency to cake and solidify could not be obtained and treated in such high concentration. With conventional methods, it is difficult to keep the sludges (particularly sludges from pulps which have a high sedimentation rate and which form viscous heavy sludge) in a flowable condition and to prevent local solidification. Local solidification would, of course, put the sedimentation separator out of operation within a very short time.

The significance and thickening method of this invention will be appreciated by comparison with special thickeners of the type employing a rotary raking structure, which are known to provide special means effective towards encouraging the de-watering increasing the concentration of the sludge. An example (see U.S. Patent No. 1,938,894) is a known thickener especially for flocculent pulp such as gluten pulp deriving from the manufacture of starch, which provides a rotary rake structure with the usual blades fixed directly to the arms of the structure and a picket fence structure of vertical rods extending upwardly from the rake arms in a zone above the raking blades. These rods operate within the so-called compression zone of this flocculent sludge to effect therein a gentle agitation to encourage the separation and escape of water from the flocs.

The contrast in purpose and method of operation, as between such a known picket fence thickener of the above patent and the thickening unit of this invention, is explained as follows: The picket fence mechanism was designed especially for use in the thickening of pulps that are predominantly flocculent or compressible. The picket fence mechanism is characterized by pickets or palings of various cross-sectional shapes which extend upwardly from the rake arms, which rake arms in turn extend relatively close to the tank bottom since they have directly attached to them the conventional sludge raking blades. With such flocculent pulps these upward pickets, have the effect of re-arranging the floc structure of the pulp in the so-called compression zone in the settling pattern of that pulp, as they impart to the pulp sideways pressure, thereby producing a squeezing action that compresses the flocs in what may be called a wringing out effect, thereby releasing water entrained in the flocs and between the flocs. This picket fence action results in producing a more compact floc with less water entrained, and hence a higher solids concentration in the discharging sludge.

The effect of such picket fence squeezing action upon such flocculent pulp is not necessarily localized between the pickets, and its effect may make itself felt or project itself even one or two feet ahead of the pickets themselves.

By contrast, the thickening unit and its method of operation are especially suited for the handling of pulps that are predominantly granular or crystalline or may have thixotropic characteristics, and will produce a much denser type of sludge not comparable to those handled by the picket fence thickener raking mechanism. In the mechanism to practice this invention, the stems of the blades extend downwardly from the arms through the sludge thickening zone which may herein be termed the detention, storage, and mixing zone, while the blades proper operate at the bottom in the kneading zone that underlies this storage zone. In this way, the stem construction works through dense pulp under conditions where the conventional shallow blades attached directly to the rake arms of standard mechanisms would fail and the operation would bog down. The thickener of this invention operates successfully in handling thixotropic pulps that would tend to form the so-called "islands" with standard thickener mechanisms, and would be able to thicken such thixotropic pulps to a markedly higher concentration than was heretofore possible with standard mechanisms.

The palings or pickets of the patented machine would be practically inoperative when used under sludge thickening conditions of this invention, whereas the thickener of this invention would do no good under the picket fence sludge treating conditions described above. In other words, full benefit of the picket fence operation is attainable with sludges that are predominantly flocculent and compressible, whereas in the thickener of this invention optimum results are attainable with sludges that are of the more sandy or crystalline nature and predominantly denser, or else less flocculent and less compressible.

By contrast, in accordance with the present invention, the sludge being concentrated at the bottom of the settling tank, is constantly and thoroughly kneaded in a bottom zone that lies below a zone of sludge accumulation, so that the difficulties arising in the formation of consistent or thixotropic sludges are avoided.

By reason of the rigid stilts that connect the blades to the rake arms of the rotary structure, the arms are disposed substantially above the zone of sludge accumulation, with oversized blades spaced sufficiently apart from one another to avoid bridging or sludge island formation. Such a construction of the rotary structure in the operation of this thickener serves for the purpose of (a) preventing island formation while cutting through the mass of sludge below the arms, as it tends to become thixotropic, (b) thoroughly homogenizing and kneading the sludge mass below the arms thereby promoting the substitution of finer particles for water as a void filling between larger particles while facilitating the escape of water, and (c) gaining the additional advantage of a hydrostatic squeezing effect from the zone of sludge accumulation while at the same time sealing off the escape of the very fine particles from the bottom zone into thinner zones.

Some sedimentation separators in which the separation of the solids from the liquids containing the suspended solids may be effected in accordance with the invention are shown in the accompanying drawings. Referring to Figure 2, a separation or sedimentation vessel consists of a cylindrical tank 1 having a slightly conical bottom 3 terminating in a central discharge pipe 2 having a shut-off device or valve 4. The upper edge of the sedimentation tank or vessel 1 is in the form of an overflow lip or weir 5, leading into an annular overflow trough 6 which serves as an outlet for the clarified liquid which overflows from the tank 1 after sedimentation of the solids.

The tank is provided with a rotating raking device which is rotated by a central shaft 7 of strong construction. This raking device consists of the shaft 7 proper, rake arms 8 and raking blades 10 connected to the arms 8 by rods 9.

Figure 2A:
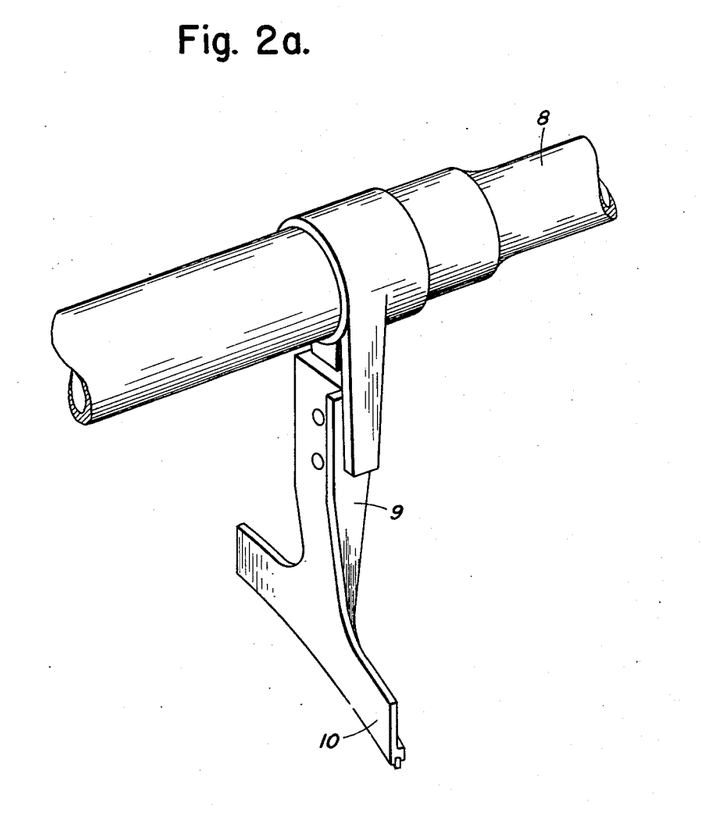
Figure 2a is a perspective view showing a rabble blade and its attachment to a rabble arm.
Figure 3:
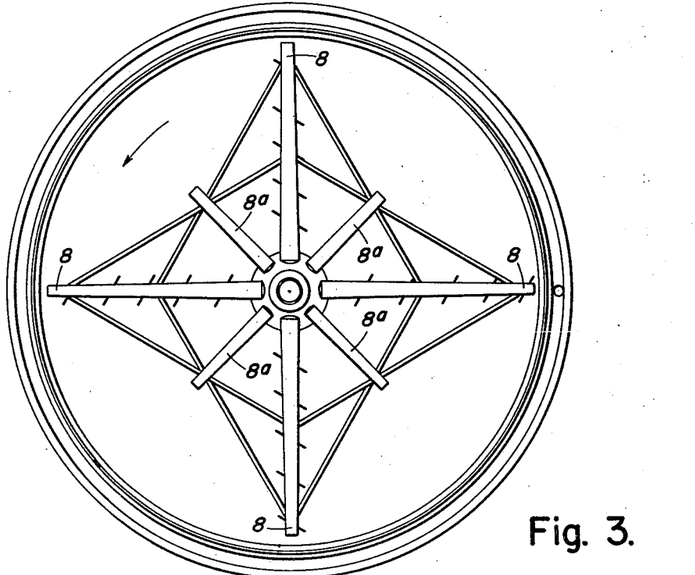
Figure 3 is a diagrammatic plan view of the sedimentation separator shown in Figure 2.

The settling tank is so constructed that its height is sufficient to enable it to hold both the layer height of sludge required for obtaining the final degree of concentration of sludge as desired and the height of liquid required for this degree of concentration of solids. The rake arms 8 are positioned above the bottom of the tank so that they will not contact or pass through the sludge, i.e., the same position above the normally highest sludge level. The raking blades 10 which move in close proximity to the bottom of the tank are attached to the arms 8 by long rods 9. Owing to the high resistance offered by the viscous sludge, these rods 9 should be of particularly strong construction and should be so dimensioned i.e. stream-lined, that they will neither impair the sedimentation process nor cause the layer of sludge to offer excessive resistance to being passed through and cut thereby. Thus, for example, these rods 9 may have oval or flat cross-sectional profiles in the direction of motion and may be reinforced by ribs. The raking blades 10 and the rods 9 are preferably fastened to the arms 8 by means of screw or other disengageable connections (as shown in Figure 2a) so that they may be changed.

The distance between each of the individual raking blades on a rake arm should be as great as possible in order to avoid any tendency to solidify and cake the material between the blades, i.e., arching. This distance must be selected in accordance with the consistency of the particular sludge being treated; the more viscous the sludge, the greater the distance. The angle of the individual blades 10 to a radius passing through the axis of the arm 8 to which they are attached should be great enough to guarantee continuous sliding action and thus effect good conveyance of the sludge, depending on its viscosity. In order for every point on the blade to have the same angle of inclination to the corresponding radius to that point it is necessary that the blade has a curved shape with a uniform curvature, since the radii to various points along the blade have different lengths, i.e. they decrease in length from the leading edge of the blade.

The height and the number of the raking blades 10, as well as the rotational speed of the raking device, are so chosen that the amount of sludge conveyed towards the center of the tank 1 is always larger than the amount of sludge which will collect in the same period of time. While the individual particles of solid within the layer of sludge will continuously descend to the bottom by the action of gravity, the entire sludge is moved across the bottom in the direction of the center and will flow outwardly again in a radial direction due to the excess conveyance by the raking device. This turning over and kneading of the sludge influences the sedimentation process extremely favourably and allows a concentration of solids in the sludge to reach a value never before obtainable by conventional methods while still maintaining the sludge in a flowable condition. The further concentration of solids in the sludge in the zone in which the sludge under the action of the raking device being conveyed thereby, is favorably influenced by the additional motion caused by the raking device. This motion is only caused in the zone in which the sludge is formed and is not caused in the zone in which the clarified liquid is formed, which should be maintained as stagnant as is possible. Due to the additional turning over of the sludge, a kneading effect is produced which aids in the release and escapement upwardly of the liquid in the sludge, thus increasing the final sludge density. In addition, the kneading effect, when operating with liquids such as pulps containing solids of different particle sizes, prevents the separation of these various fractions, which, as is well known, conventionally occurs during the sedimentation separation and thus favors production of a sludge with a greater final density of solids.

In order to prevent disassociation or size fractionation as the liquid is fed into the settling tank, the feeding is, in a preferred embodiment of the invention, so effected that a uniform grain distribution is effected as the sludge forms. This result may, for example, be obtained by providing the separation tank with as many equidistantly positioned inlets for the material as is possible.

Figure 4:
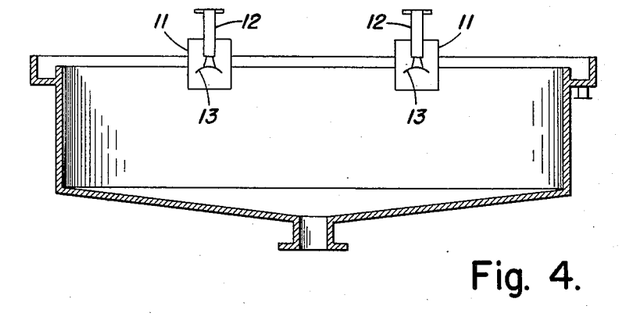
Figure 4 is a diagrammatic vertical cross-section of a sedimentation separator constructed in accordance with the invention showing a plurality of feed inlets.
Figure 5:
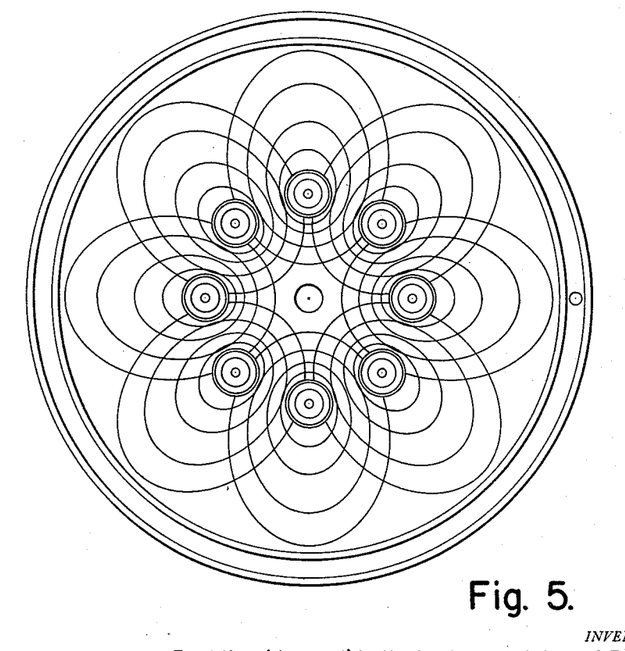
Figure 5 is a diagrammatic plan view of the separator shown in Figure 4.

As shown in Figures 4 and 5, the settling tank is provided with a number of feed inlets 12 of conventional design, which are equidistantly positioned from the central axis of the tank and from each other on a mean diameter. Each of these feed inlets is provided with a steadying cylinder 11 and a baffle plate 13. As is known, the particles of solids will separate out by sedimentation under each feed inlet in concentric curves with the particle sizes decreasing in an outward direction from the center, as is diagrammatically shown in Figure 5. Due to the intersection of the sedimentation curves of the individual feed inlets, a rough pre-mixing, and, consequently, a more uniform grain distribution is effected.

Figure 6:
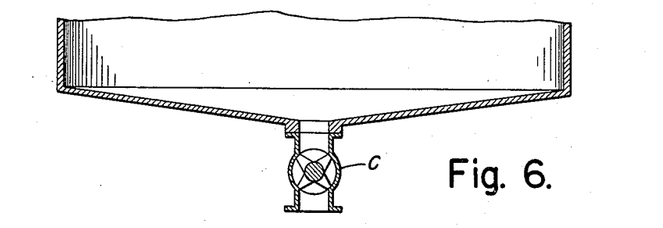
Figures 6, 7 and 8 diagrammatically illustrate the various ways of discharging sludge from the sedimentation separator.

In operation, the liquid containing suspended solids, such as, for example, an ore pulp, is fed into the separating tank 1 through the feed inlets 12. The solid material, due to the force of gravity and its greater specific gravity than the liquid, settles to the bottom of the tank, leaving a clarified liquid in the upper portion of the tank. The raking device is rotated by rotating the shaft 7. As the sludge is formed at the bottom of the tank, it is conveyed toward the discharge 2 and kneaded and thus concentrated in the manner described. The clarified liquid overflows over the overflow lip or weir 5 into the annular trough 6, form which it is discharged after the addition of additional liquid through feed inlets 12. The concentrated sludge is discharged through the discharge outlet 2 and valve 4. Alternatively the discharge outlet 2 may, for example, lead into a cellular discharge wheel 6, as is shown in Figure 6. The quantity of sludge discharged through the outlet 2 must always be less than the quantity conveyed to the outlet by the raking device. The total quantity of sludge discharged is, of course, equivalent to the quantity of solids conveyed to the separator.

Figure 7:
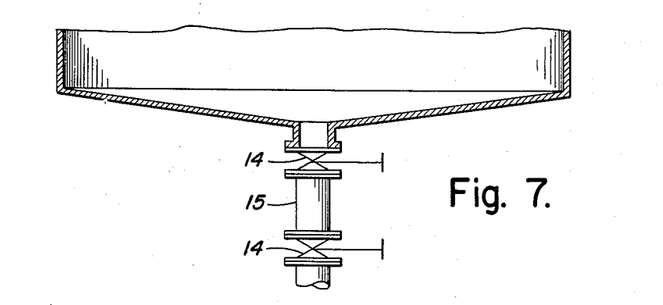
Figure 8:
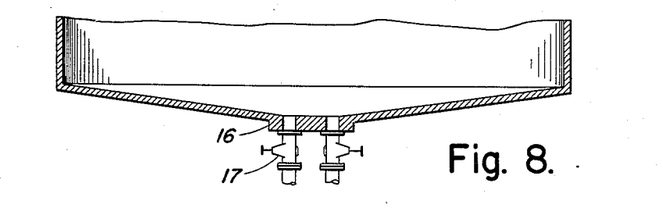

As shown in Figure 7, discharge may alternatively be effected through a gate formed between two valves 14 in a hollow shaft 15. The discharge may also be effected, for example, as shown in Figure 8 by one or two short connections 16, mounted in the center of the bottom of the tank, which connection or each connection is, for example, provided with a valve 17 for the shutting off and regulation of the free discharge of sludge which valve may be used for sludges of all types. Discharge may also be effected in any discharge device of known or conventional construction which will offer no resistance to the sludge being discharged, which, depending upon the nature of the material is, more or less of a viscous nature.

Sedimentation separators are often used for the treatment of corrosive materials, such as, for example, in the clarification of pulps such as acid metal salt solution. The apparatus, when used for this purpose, must be corrosion-proof. This may be effected, for example, by providing the tank with an acid-proof lining, and protecting the raking device by means of a hard rubber coating. In this connection, special attention has to be given to the raking blades, particularly when they are used in the clarifying of pulps of ore dust which cause a great deal of wear and abrasion due to the hardness of the ore particles. In order to protect the raking blades under these conditions, the conveying side of the blade, may, in addition to the usual hard-rubber coating, be given a coating of abrasion resistant rubber, which may, for example, be as hard as leather or soft. In addition, the leading edge of the blade which cuts through the sludge may be provided with a soft rubber reinforcement.

Figure 9:
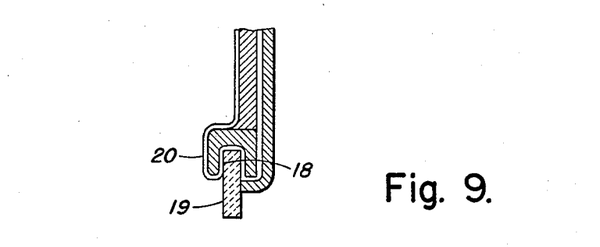
Figure 9 is a diagrammatic vertical cross-section showing a design for the lower end of a rabble blade in accordance with the invention.

The lower edge of the rabble blade is subjected to the greatest wear and abrasion. As shown in Figure 9, the blade 10 is, in a preferred embodiment of the invention, contructed so that the lower edge is particularly abrasion-resistant. The blade is provided with a groove 18 along its lower edge. The resistant plate or plates, such as, for example, abrasion-resistant, sintered corundum plates 19 are set, one after another, in groove 18. These plates are preferably fixed in the groove by lining the groove with raw india rubber, as, for example, the rubber coating 20, placing the plates in the groove, and subsequently vulcanizing the unit.

When the apparatus is used in connection with sludges which cause less strain and abrasion on the raking devices, a soft rubber coating on the lower edge of the raking blade will generally suffice. Thus, for example, a soft rubber plate of plate of similar material may be fastened to the blade in such a manner that is projects beyond the lower edge thereof.

In the operation of the thickener (see Figures 10 and 11) there is topmost the zone ($Z_1$) of clarified liquid. Below this there is the zone ($Z_2$) of "free settling" in which all particles are free falling within the liquid and the settling velocity follows the law of Stokes. Below this there is the zone ($Z_3$) of hindered settling in which the solids and the liquid move in opposite direction. In an intermediate portion of that zone the solids have become stationary while the liquid moves upwardly, while in the lower portion both the solids and the liquid no longer move. It is in this letter phase of the thickening pattern that conventional thickening operates in the manner initially indicated, with the possibility that remixing may occur of the fine sludge being conveyed in a very shallow bottom zone with the dilute sludge above.

A conventional thickener of the continuous type (with rotary raking structure) operates in the range of thickening where the sludges are still flowable, and in such state of flowability that the raking blades of the mechanism will serve in effect merely to help the sludge move or slide down the inclined tank bottom towards the outlet, thus working on a comparatively very thin layer of sludge of what prior practice considers final concentration. In this condition the internal sludge structure or relationship of the particles have attained that state in which the particles touch one another but will settle no further having reached that degree of flowability and solids concentration at which they are conventionally handled by the raking structure and discharged. By comparison with the superjacent intermediate transitional zones of the sedimentation pattern, the bottom sludge layer in operation is relatively thin and is maintained as against a carefully controlled rate of sludge discharge, providing little if any sludge storage capacity.

In other words, a relatively thin bottom layer of sludge sufficiently flowable and hence relatively dilute (as compared to filter cake concentration) was accepted as normal from a conventional thickener, if the operation was to proceed continuously, readily controllable, and trouble free, especially where the sludge possessed more strongly pronounced characteristics of thixotropy.

Thus, since in the conventional thickener, there is practically no storage of sludge of discharge density, it necessitates careful control of the sludge discharge rate in accordance with the rate at which sludge is being conveyed to the outlet. It is in this phase of the thickening pattern that conventional thickening operates in the manner above indicated, with the possibility that remixing may occur of the final sludge on the bottom with the more dilute sludge above.

Figure 10:
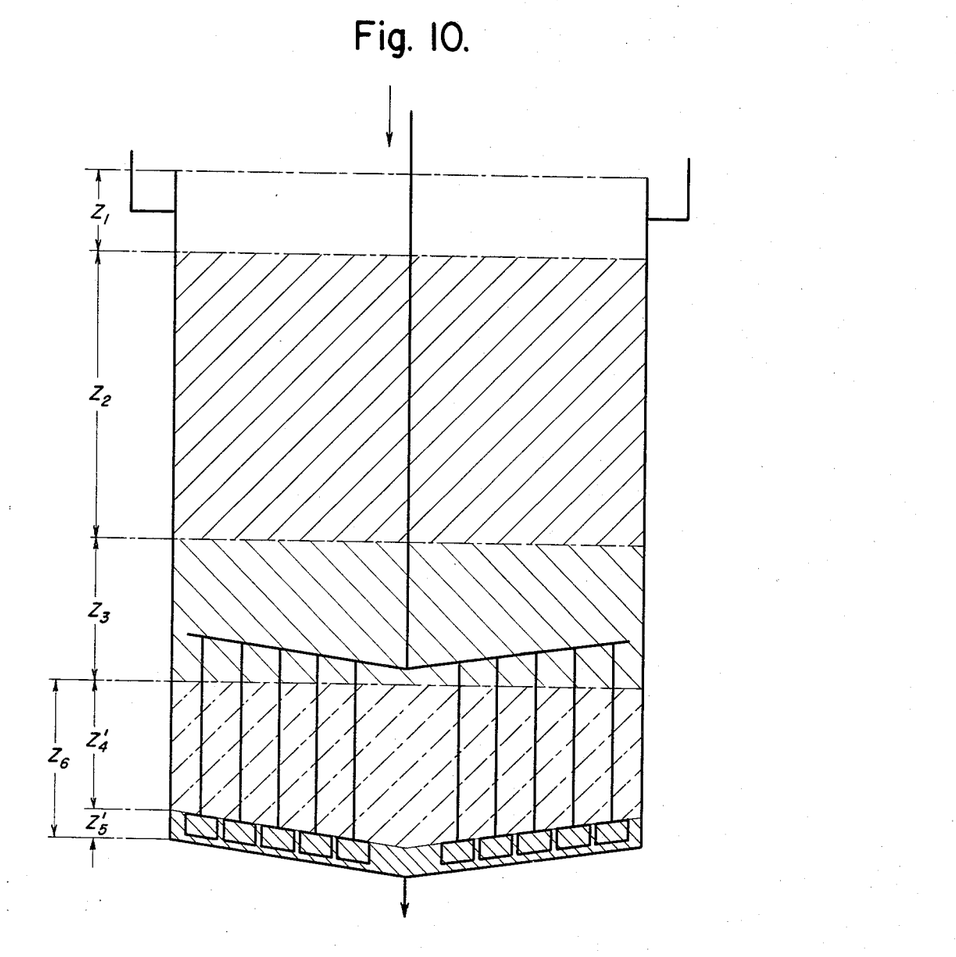
Figure 10 is a diagrammatic representation of thickening zones in a thickener operating in accordance with this invention.
Figure 11:
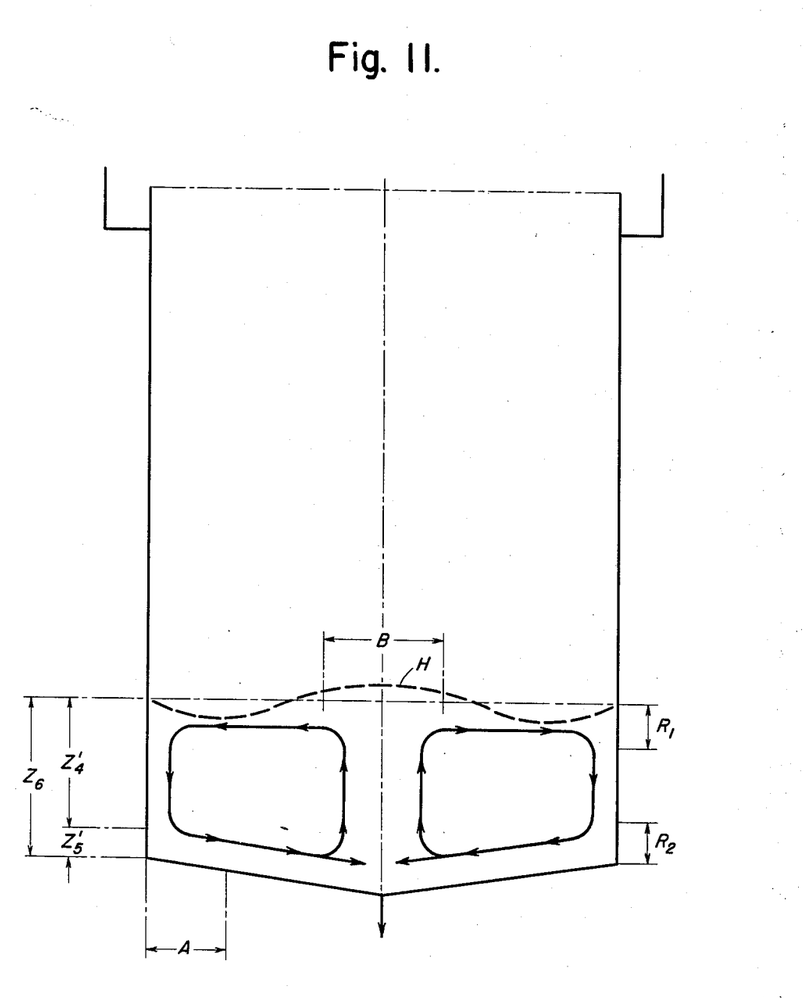
Figure 11 is a diagram representing the operation of the Figure 10 thickener with respect to sludge movement in the thickening zone.

By contrast, the improved method provided by the present invention extends its operation significantly beyond the conventional thickening phase, by maintaining an additional subjacent operating zone ($Z_6$). That zone is herein variously termed the super-thickening zone, or else the zone for mixing, kneading, and homogenizing, as well as for storing and detention. It may also be termed the cushioning or buffer zone.

That is to say, the thickening method of this invention operates in the range of comparatively non-flowable sludges and in one embodiment employs a super-thickening zone of appreciable and significant depth in addition and subjacent to the conventional sedimentation zone pattern. With this addition the improved method provides an operating zone for mixing, storage, and detention of the solids; also it provides an operational cushion or buffer, and last but not least by its very depth an extra static pressure column of solids, the effect and significance of which will presently appear.

Operating in the range of non-flowable sludges of super concentration (a range where viscosities and thixotropic criteria become much more pronounced and predominating factors), one embodiment of this thickening method employs a raking mechanism functionally and structurally in such a manner that in the bottom strata of the added zone the sludge is conveyed by the raking blades towards the central sludge outlet at a rate significantly greater than that of the sludge discharge.

In this newly added operating zone ($Z_6$) there are further this discernible a mechanical kneading zone ($Z'_5$) at the very bottom and above it a mixing and storage zone ($Z'_4$). Thus, the zone ($Z'_4$) is functionally interposed as a protective zone between the kneading zone ($Z'_5$) below and the conventional hindered settling zone ($Z'_3$) above. In this way, the kneading (with re-arranging of the particles) in zone ($Z'_5$) by the blades is effected under the added static pressure of the sludge in zone ($Z'_4$) while avoiding the remixing of super-thickened sludge with thin sludges from zones above.

The arrangement of the rotary structure is such that the rake arms extend a distance above the tank bottom sufficient to be substantially above or clear of the zone ($Z_6$).

Storage of a quantity of sludge of thixotropic characteristics is thus maintainable free of thixotropic solidification because of the gently mobilized condition in zone ($Z'_4$) even while permitting the sludge to yield liquid into the hindered zone ($Z_3$) above.

The compound functions and effects in the super-thickening zone $Z_6$ are attainable by way of a mild cyclic motion imparted to the sludge within that zone by way of having the raking blades convey sludge to the outlet at a significantly greater rate than is allowed to be withdrawn therefrom. In this way (see Fig. 11) there is induced and maintained in the zone $Z_6$ an upward migration of sludge in a central vertical core portion or column B of the sludge bed, the sludge thence moving radially outwardly through the upper ranges $R_1$ of that zone and into and down through the annular portion A surrounding the core portion, thus to effect the circulation to zone $R_2$ as well as a turning over of the sludge within this super-thickening zone. Where the sludge becomes sufficiently thick as well as thixotropic, such induced recirculation may even manifest itself in the appearance of a central pump H in the surface profile of this super-thickening zone.

The following example is given by way of illustration and not limitation.

An apparatus of the construction shown in Figure 2 was used and was provided with four rake arms each with raking blades. The distance of the lower edge of each of the raking blades from the longitudinal axis of the rake arm was 1375 mm. The height of the raking blades decreased from 231 mm. to 143 mm. as the distance from the center of rotation decreased. The tubular raking arm had a diameter of 400 mm. which decreased in an outward direction to 150 mm. The distance between the raking blades was about 1000 mm. and the inside diameter of the separator was 13.2 m. and the same had a cylindrical height at the edge portion of about 3 meters. Four inlet pipes 12 were provided with a diameter of 120 mm. each. Pulp was fed into the settling tank at a rate of 55 cubic meters per hour. The rake arms were rotated at 0.091 revolution per minute with a power requirement of 10 kilowatts. 12 tons of sludge was obtained per hour with a content of 4000 grams of solids per litre. The specific gravity of the solids was 5.2 grams per cubic centimeter. The specific gravity of the clarified liquid obtained was 1.2 grams per cubic centimeter. The initial content of the solids and the pulp fed in was 180 grams per litre. The settling rate approximately 8 cm. per minute and the temperature of the sludge was 85° C.

This method of sludge thickening therefore makes it possible for different kinds of suspensions, crystalline as well as voluminous precipitation sludges, to attain ranges of concentration heretofore not attainable by ordinary thickening, which attainable concentrations in some instances are comparable to solids concentration of a filter cake.

The voluminous precipitations as distinct from the crystalline sludges, can be designated as amorphous colloidal as well as non-crystalline and compressible, examples of which are $Co(OH)_3$, $Co(OH)_2$, $Zn(OH)_2$ and others. Representatives of crystalline sludges are for example such materials as $CaCO_3$, $CaSO_4$, $2H_2O$, iron oxide sludges, and others.

As a more special embodiment, this invention proposes to functionally combine a conventional clarifier-thickener unit with a super-thickening unit. This sequence of clarification and superthickening units may be termed the primary and the secondary sedimentation unit, or else the clarification-pre-thickening unit and the super-thickening unit respectively. A compound operation of these two units or stages produces high overall clarification thickening effects, as will be further explained. The primary unit or tank can assume the burden of clarification together with a relatively small degree of thickening, whereas the main burden is imposed upon the super-thickener. It is to be noted that such compound operation dispenses with the otherwise necessary careful underflow control of ordinary thickeners for the reason that this new operational combination is capable of absorbing such fluctuations in concentrations as may appear in the underflow of the primary unit. In this two-stage embodiment in order to obtain optimum overall results it is possible to shift the load to a certain extent between the primary and secondary units in such a manner that there results a combination of optimum clarification effects with maximum super-thickening. In this manner, it is possible to utilize the clarification capacity of a tank of large diameter most effectively, whereas the secondary or super-thickening tank provides the deep sludge bed required for the present method of super-thickening such as above set forth. When the area of the super-thickener is smaller than the area of the clarification tank, it is possible to reduce to a relative minimum the torque load imposed upon the rotary rake structure in the super-thickening zone.

This compound thickening system provides an operation in which the two component sedimentation units maintain themselves in an operational balance, whereby the rate of underflow discharge of the primary clarification unit need not be carefully controlled, for the reason that the super-thickening unit provides a buffer effect to insure operational flexibility.

In another embodiment the clarification or pre-sedimentation stage is combined with the super-thickening stage within a single vertical tank construction of such relatively smaller diameter as is inherent to a multiple compartment sedimentation unit. In this unit the clarification or sedimentation section is arranged above a super-thickening section. The clarification section comprises a plurality of clarification compartments one above the other having hydraulic communication such as is known in substance from multiple compartment clarification tanks. The super-thickening section is represented by a bottom compartment of suitable diameter and depth adapted to meet the requirements for producing the super-thickening effects above set forth. In this compound thickening unit the raking structure operating in the super-thickening section is such that it will produce the super-thickening effects and is unitary with the sludge raking arms that operate in the pre-sedimentation compartments of the upper section of this tank unit.

*Examples*

(1) Waste liquor from a potash plant, containing essentially a suspension of a montmorillonite type clay and alkali chloride in a saturated alkali chloride solution, when subjected to thickening under ordinary conditions, produced a sludge containing about 6.6% solids (specific gravity of the solids 2.5).

The identical suspension was thickened in accordance with the method of this invention in a thickener corresponding to Figure 2, whereby there was established a sludge bed significantly deeper than the height of the raking blades so that the sludge remained in the thickener for about one day's duration from the time it settled to the time of its discharge.

The sludge being discharged contained 9.9% solids. By further increase of the depth of the sludge bed and thus of the detention time, the solids content of the discharge can be increased to 12% to 13%.

(2) In a manner similar to that indicated in Example 1, an aqueous zinc concentrate suspension was thickened in the usual manner as well as in the manner of this invention. In the first instance there was delivered a sludge having 46.2% solids content, in the latter instance a sludge having 82.0% solids. The sludge was further thickened to a concentration of more than 87% (specific gravity of the solids 4.3) when the detention time was increased in accordance with the invention.

(3) A corresponding comparative test run with a suspension from a Portland cement plant with usual thickening produced a sludge having about 50% solids, whereas a sludge of 66.7% of solids was produced by thickening in accordance with the method of this invention. By increasing the detention time the sludge concentration was raised to more than 70% (specific gravity of the solids 2.74).

(4) A run-off suspension of gold ore from a cyanide leaching plant was thickened in a manner similar to that indicated in Example 1, namely in a normal manner of thickening, and on the other hand in accordance with the method of this invention. Normal thickening produced a sludge having a 30.5% solids, whereas thickening according to this invention produced 73% solids (specific gravity of the solids 3.0).

(5) A bituminous fine coal suspension from a coal washing plant was subjected to similar comparative testing. Normal thickening produced a sludge of 20.6% solids, whereas thickening according to the method of this invention produced a sludge of 33.1% solids. With a corresponding increase of detention time this concentration can be increased to about 40%. The resulting sludge had thixotropic characteristics (specific gravity of the solids 1.53).

(6) A suspension from an abrasives factory, constituting a suspension of corundum of a particle size up to about $12\mu$ produced under normal thickening conditions, a sludge having 48.5% solids, whereas thickening by the method of this invention produced a sludge of 60.9% solids concentration. This concentration can be increased by an increase of the detention time to about 72% (specific gravity of the solids 3.4).

(7) A calcium carbonate suspension from a causticizing plant produced, by normal thickening, a sludge of 42.1% solids concentration, whereas thickening by the method of this invention produced a sludge containing 62.9% solids. By extending the detention time this concentration can be increased to 67% (specific gravity of the solids 2.46).

(8) A magnesium hydroxide suspension which had been produced in a strong brine through precipitation by means of a calcined dolomite, when thickened under normal conditions, produced a sludge of 30.5% solids concentration whereas thickening by the method of this invention produced a sludge containing 46.1% solids. By a corresponding extension of the detention time, it was possible to increase this concentration to about 56.0% (specific gravity of the solids 2.4).

(9) A flue dust suspension obtained by the washing of blast furnace gases, produced a sludge of 38.5% solids concentration, when thickened under normal conditions, whereas by thickening in accordance with this invention it produced a sludge containing 61.3% solids. By a corresponding extension of the detention time this concentration is increased to about 66% (specific gravity of solids 3.1).

This application is a continuation-in-part of application Serial No. 400,832, filed December 29, 1953, now abandoned.

What we claim is:

1. A method for the separation of non-flocculent solids from liquids by continuous sedimentation in a thickener tank having raking blades located at the tank bottom and spaced vertically from, and rigidly connected to rake arms rotatable about the center of the tank for moving sediment to a central bottom outlet means, which method comprises maintaining in said tank an upper clarification zone, a subjacent sedimentation zone, and a sludge accumulation zone subjacent to said sedimentation zone wherein the sludge is allowed to accumulate to a level located a substantial distance above the height of the raking blades but beneath the height of the arms so that in the sludge accumulation there is established a bottom sludge kneading zone wherein the blades operate to knead as well as to convey the sludge to the outlet means, and a sludge storage zone resting upon the sludge in said bottom kneading zone; and maintaining the sludge in said storage zone gently agitated by conveying thickened sludge to said outlet means at a rate in excess of that at which sludge is withdrawn therethrough.

2. The method according to claim 1, wherein the movement of the sludge in said bottom kneading zone towards said outlet means is such as to cause excess sludge to move upwardly from said outlet means in said storage zone and then outwardly in the upper portion of said accumulation so that the sludge therein is continuously circulated.

3. In a thickening apparatus a rotary raking structure, the arrangement wherein the raking structure comprises a vertical tubular shaft member having a terminal flange at the lower end, rake arms rigidly fixed to said flange, vertical stems rigidly extending down from said arms, and raking blades rigid with the lower end of said stems so that each blade is carried rigidly by a single stem.

4. In a thickening apparatus having a rotary rake structure, the arrangement wherein means are provided for introducing feed pulp into the tank, comprising a plurality of stationary feedwell units spaced radially from and arranged about the center of the tank at the top thereof.

5. In a thickening apparatus having a rotary raking structure, wherein the raking blades comprise a body portion presenting a sediment engaging face, which body portion has a downwardly open groove along the bottom edge, a row of plate elements inserted in said groove, said plate elements consisting of abrasion resistant material comprising corundum ($Al_2O_3$); and an interposed rubber lining vulcanized to said plate elements and to said groove whereby said plate elements are held in place.

References Cited in the file of this patent

UNITED STATES PATENTS

| Number | Name | Date |
|---|---|---|
| 326,483 | Downend | Sept. 15, 1885 |
| 1,920,986 | Hutto | Aug. 8, 1933 |
| 1,938,894 | Darby et al. | Dec. 12, 1933 |
| 2,169,442 | Wuensch | Aug. 15, 1939 |
| 2,185,785 | Dorr et al. | Jan. 2, 1940 |
| 2,245,587 | Hughes | June 17, 1941 |
| 2,245,588 | Hughes | June 17, 1941 |
| 2,263,168 | Dorr et al. | Nov. 18, 1941 |
| 2,279,970 | Coe | Apr. 14, 1942 |
| 2,343,836 | Weber | Mar. 7, 1944 |
| 2,525,842 | Thompson et al. | Oct. 17, 1950 |
| 2,596,575 | MacAfee | May 13, 1952 |
| 2,742,424 | Saddington et al. | Apr. 17, 1956 |

FOREIGN PATENTS

| Number | Country | Date |
|---|---|---|
| 666,295 | Great Britain | Feb. 6, 1952 |